(12) United States Patent
Takagi

(10) Patent No.: US 9,296,166 B2
(45) Date of Patent: Mar. 29, 2016

(54) GRIPPING DEVICE FOR BEAD RING

(75) Inventor: Chikara Takagi, Gifu-ken (JP)

(73) Assignees: Fuji Seiko Co., Ltd. (JP); Fuji Shoji Co. Ltd. (JP)

( * ) Notice: Subject to any disclaimer, the term of this patent is extended or adjusted under 35 U.S.C. 154(b) by 0 days.

(21) Appl. No.: 14/386,184

(22) PCT Filed: Apr. 6, 2012

(86) PCT No.: PCT/JP2012/059563
§ 371 (c)(1),
(2), (4) Date: Sep. 18, 2014

(87) PCT Pub. No.: WO2013/150650
PCT Pub. Date: Oct. 10, 2013

(65) Prior Publication Data
US 2015/0042114 A1    Feb. 12, 2015

(51) Int. Cl.
*B66C 1/00*       (2006.01)
*B29D 30/00*    (2006.01)
*B25J 15/00*     (2006.01)

(52) U.S. Cl.
CPC ......... *B29D 30/0016* (2013.01); *B25J 15/0052* (2013.01); *B29D 2030/0044* (2013.01)

(58) Field of Classification Search
CPC ................... B29D 30/0016; B29D 2030/0044; B29D 30/48; B29D 30/32; B25J 15/0052
USPC .......... 294/104, 86.4, 119.2; 29/222, 894.35, 29/894, 894.353, 894.354, 894.37
See application file for complete search history.

(56) References Cited

U.S. PATENT DOCUMENTS

| | | | |
|---|---|---|---|
| 1,910,725 A * | 5/1933 | Valenta ........................... 294/11 |
| 2,201,285 A * | 5/1940 | Blackburn ...................... 294/34 |
| 3,265,429 A * | 8/1966 | Shatt .............................. 294/104 |
| 3,302,802 A * | 2/1967 | Muller .......................... 414/740 |
| 4,728,097 A * | 3/1988 | Vandersyde et al. .......... 271/268 |
| 2003/0042747 A1* | 3/2003 | Cote et al. ..................... 294/104 |

(Continued)

FOREIGN PATENT DOCUMENTS

| | | |
|---|---|---|
| JP | 66127/1980 | 5/1980 |
| JP | 10-166473 A | 6/1998 |
| JP | 11-207832 A | 8/1999 |
| JP | 2011-148268 A | 8/2011 |

OTHER PUBLICATIONS

International Search Report for corresponding PCT/JP2012/059563 completed Apr. 25, 2012 by the JPO.

(Continued)

*Primary Examiner* — Gabriela Puig
(74) *Attorney, Agent, or Firm* — Tarolli, Sundheim, Covell & Tummino LLPC

(57) ABSTRACT

A grasping device for a bead ring grasps the bead ring formed of a wire wound around an annular winding unit provided on the outer circumferential surface of a rotary body while fixing a beginning and a termination of the wire. The grasping device includes an upper grasping unit that grasps an upper part of the bead ring and a lower receiver that receives a lower part of the bead ring. The upper grasping unit is formed of a pair of grasping bodies that can be released from each other and closed relative to each other so as to clamp the upper part of the bead ring therebetween. The lower receiver is formed of a receiving recessed part that receives the lower end of the bead ring.

5 Claims, 4 Drawing Sheets

(56) References Cited

U.S. PATENT DOCUMENTS

2012/0169079 A1* 7/2012 Kim .................. H01L 21/68707
 294/86.4
2015/0108780 A1* 4/2015 Gatley et al. .................. 294/198

OTHER PUBLICATIONS

Translation of the International Search Report on Patentability for PCT/JP2012/059563, mailed May 15, 2012, pp. 1-4.

* cited by examiner

GRIPPING DEVICE FOR BEAD RING

RELATED APPLICATIONS

The present invention is a U.S. National Stage under 35 USC 371 patent application, claiming priority to Serial No. PCT/JP2012/059563, filed on 6 Apr. 2012, the entirety of which is incorporated herein by reference.

FIELD OF THE INVENTION

This invention relates to a gripping device for a bead ring applied for example for manufacture of vehicle tires and intended to grasp a bead ring formed by winding by a bead ring winding machine and to transfer the bead ring to a subsequent step.

BACKGROUND OF THE INVENTION

A device of this type is disclosed for example in Patent Document 1. This device includes a former that forms a bead ring by winding, and a bead receiver that receives the bead ring from inside while a segment of the former is reduced in diameter. The bead receiver described in this document is formed of a shaft member of a circular shape in cross section.

However, this device has the following problem. The bead ring is supported only from inside by the bead receiver formed of the shaft member of a circular shape in cross section. This makes the bead ring having been received by the bead receiver move easily on the bead receiver. This has made it difficult to stably take the bead ring out of the former and transfer the bead ring.

PRIOR ART DOCUMENTS

Patent Documents

Patent Document 1: Japanese Laid-Open Patent Publication No. 11-207832

SUMMARY OF THE INVENTION

It is an object of this invention to provide a grasping device of a simple structure for a bead ring capable of grasping a bead ring stably.

To solve the aforementioned problem, one aspect of this invention provides a grasping device for a bead ring including a grasping unit with a pair of grasping bodies to grasp a bead ring formed on an outer circumferential surface of a rotary body by winding. A grasping strip is pivotably supported with a shaft on one of the grasping bodies. The grasping strip grasps the bead ring together with the other grasping body. The grasping strip receives the bead ring in opposite side positions with respect to the shaft of the grasping strip.

In the aforementioned grasping device for a bead ring, it is preferable that the grasping strip includes a grasping recessed part to receive the bead ring in the opposite side positions with respect to the shaft.

In the aforementioned grasping device for a bead ring, it is preferable that the other grasping body is an insert to be inserted between a winding unit and the bead ring.

In the aforementioned grasping device for a bead ring, it is preferable that the grasping unit grasps an upper part of the bead ring.

In the aforementioned grasping device for a bead ring, it is preferable that the grasping unit is capable of moving in a radial direction of the bead ring relative to a grasping device body.

It is preferable that the aforementioned grasping device for a bead ring includes a receiver that receives a lower part of the bead ring.

In the grasping device for a bead ring of this invention, a bead ring is grasped by a pair of grasping bodies. The bead ring is grasped in opposite side positions with respect to the shaft of the grasping body. Accordingly, even if the bead ring is formed of multiple bead wires, the bead ring can still be grasped with uniform force, so that the bead ring can be grasped stably.

DETAILED DESCRIPTION OF THE PREFERRED EMBODIMENTS

An embodiment of a grasping device for a bead ring that embodies this invention is described below by referring to FIGS. 1 to 4.

Figure 4:
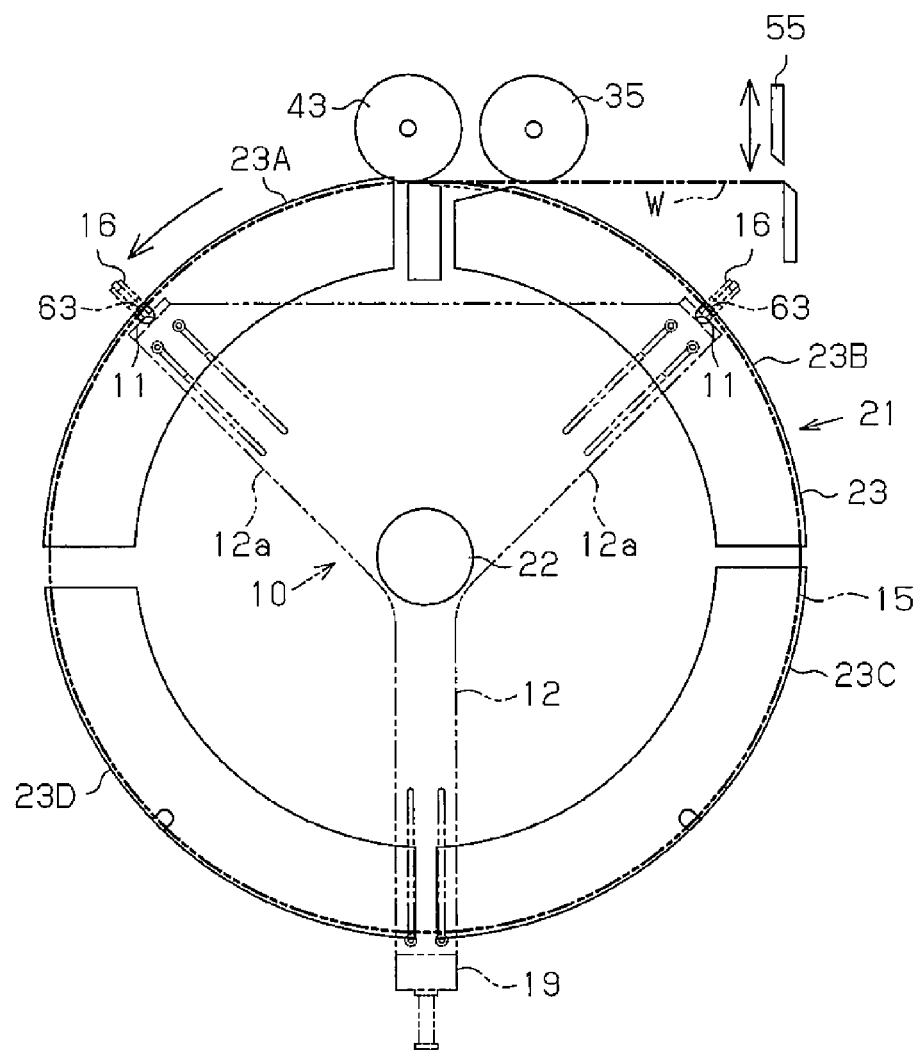
FIG. 4 is a front view showing an operation of a bead ring winding machine and that of the grasping device.

As shown in FIG. 4, a rotary body 21 is supported by a frame not shown in the drawings such that the rotary body 21 can rotate about a rotary shaft (horizontal shaft) 22. The rotary body 21 has an outer circumferential surface provided with an annular winding unit 23. A wire W is wound around the winding unit 23 to form a bead ring 15. The winding unit 23 is formed of a recessed part not shown in the drawing. The winding unit 23 is divided in the circumferential direction of the rotary body 21 into multiple partitioned members 23A to 23D. Each of the partitioned members 23A to 23D is supported on the outer circumferential surface of the rotary body 21 such that each of the partitioned members 23A to 23D can move in the radial direction. The wire W is formed by coating a metallic wire with rubber, for example.

A recessed part 11 for insertion is formed in the substantially central part in the circumferential direction of each of the partitioned members 23A and 23B. A roller 35 and a roller 43 supported by a frame not shown in the drawings are arranged above the rotary body 21. The wire W is pressed into the winding unit 23 by the rollers 35 and 43 and wound around the winding unit 23 to form the bead ring 15. A cutting mechanism 55 is arranged on an upstream side relative to the rollers 35 and 43 in a feeding path for the wire W. The cutting mechanism 55 is to cut the wire W while a give amount of the wire W is wound around the winding unit 23.

Figure 1:
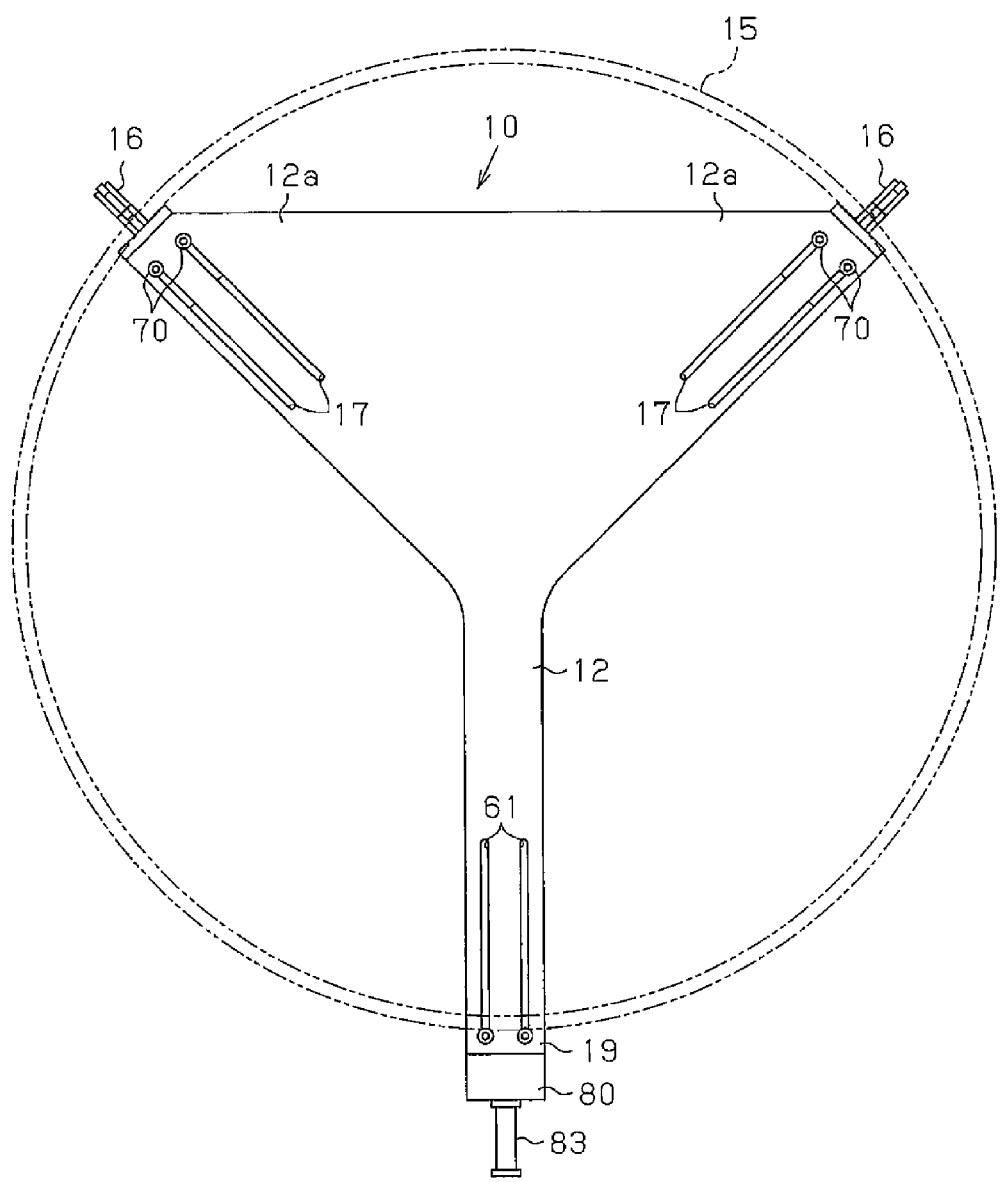
FIG. 1 is a front view of a grasping device for a bead ring according to an embodiment of this invention.
Figure 2:
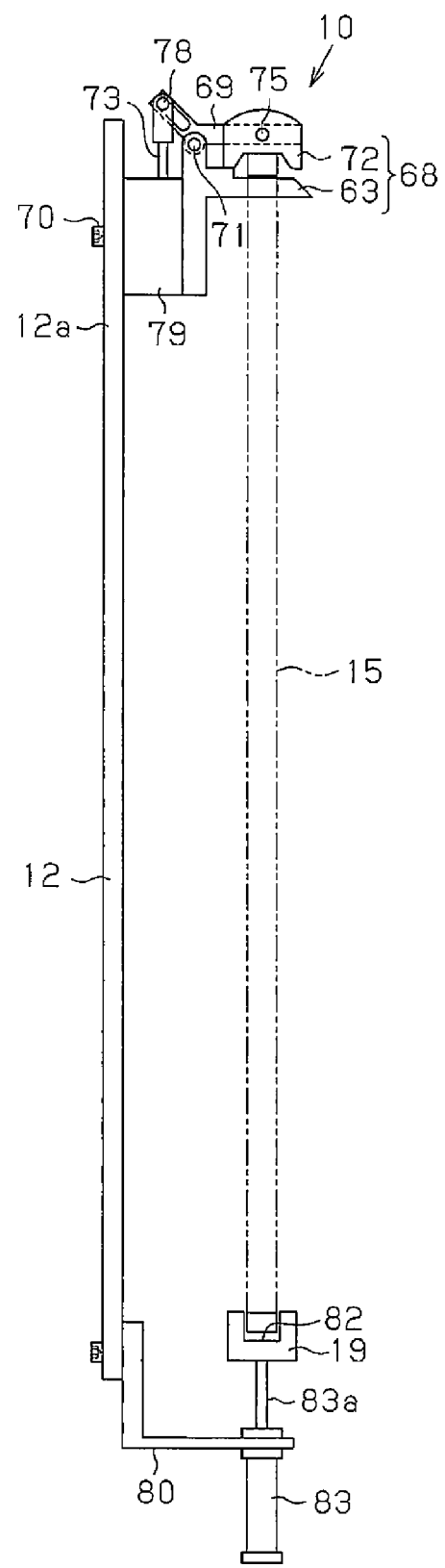
FIG. 2 is a side view of the grasping device for a bead ring.

As shown in FIGS. 1 and 2, a frame includes a grasping device body 12 arranged in a position facing the winding unit 23 of the rotary body 21. The grasping device body 12 is formed into a Y shape as viewed from the front. The grasping device body 12 is configured such that it can be moved by a first mechanism not shown in the drawings in a reciprocating manner from side to side as viewed in FIG. 1. The grasping device body 12 is also configured such that it can be moved by a second mechanism not shown in the drawings from side to side as viewed in FIG. 2 relative to the winding unit 23. The upper part of the grasping device body 12 is provided with a pair of branches 12a. Each of the branches 12a supports one upper grasping unit 16 that grasps an upper part of the bead ring 15. The branch 12a is provided with a pair of long holes 17. The upper grasping unit 16 is supported such that it can move obliquely along the long holes 17. A lower part of the grasping device body 12 is provided with a lower receiver 19 that receives a lower part of the bead ring 15. The lower part of the grasping device body 12 is further provided with a pair of long holes 61. The lower receiver 19 is supported such that it can move up and down along the long holes 61.

Figure 3:
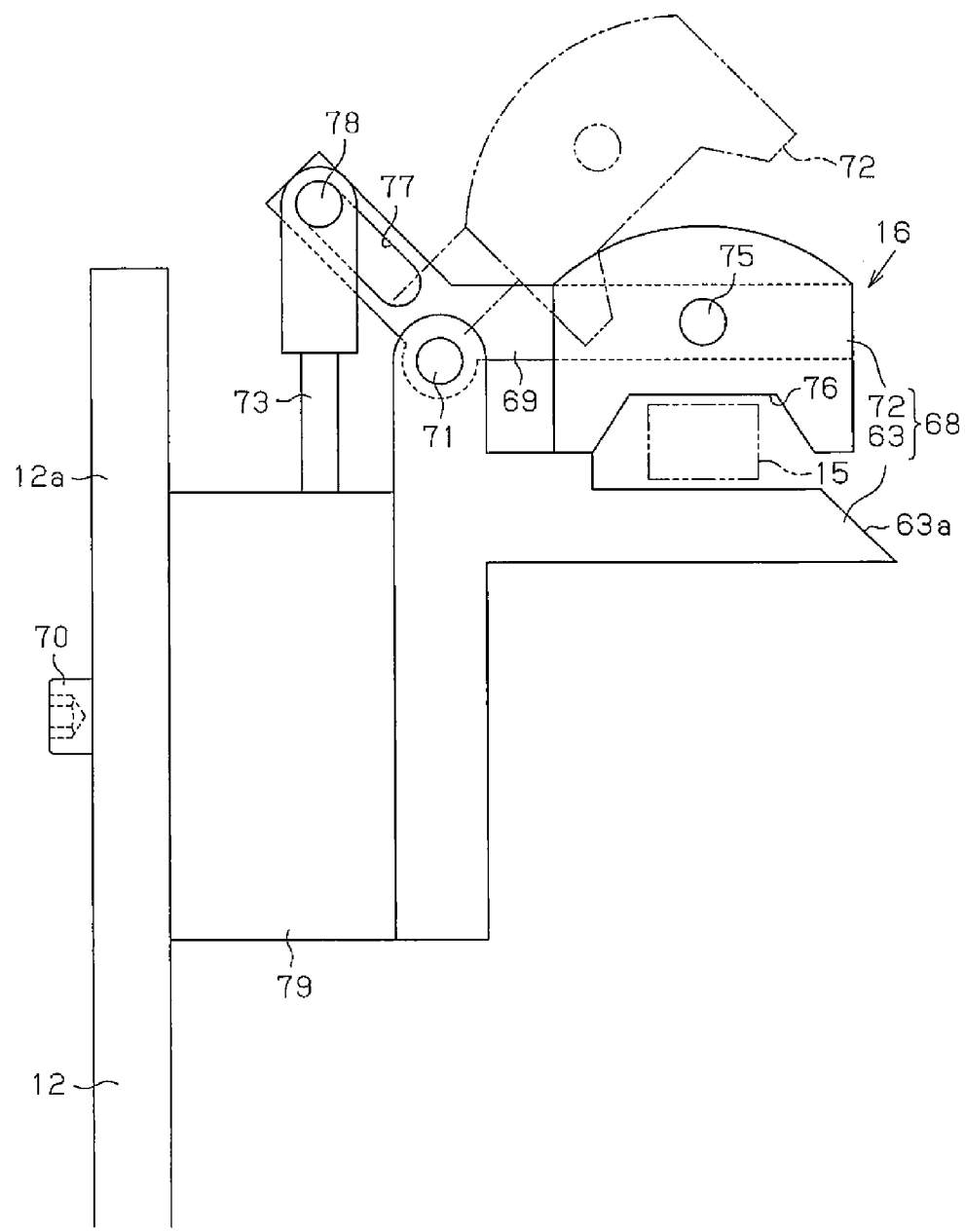
FIG. 3 is a front view of an upper grasping unit of the grasping device.

As shown in FIG. 3, a lever grasping body 69 forming a grasping body 68 is rotatably supported on an insert 63 with a shaft part 71. A grasping strip 72 of an inverted U shape in cross section is arranged at an end of the lever grasping body 69 so as to form a bridge. The grasping strip 72 is pivotably coupled to the lever grasping body 69 with a shaft 75. The insert 63 has a tip provided with a slanting part 63a that makes the insert 63 thinner in a position closer to the tip. This structure enables the insert 63 to be inserted easily into the recessed part 11 for insertion while the bead ring 15 is formed by winding around the winding unit 23.

The grasping strip 72 has a lower edge provided with a grasping recessed part 76 that is formed such that the bead ring 15 can be grasped in the grasping recessed part 76. The grasping recessed part 76 is formed by forming a cutout of a trapezoidal shape with respect to the shaft 75 in the lower edge of the grasping strip 72. A cylinder 79 for rotation with a piston rod 73 is attached to the branch 12a with an attaching bolt 70. The piston rod 73 is coupled through a pin 78 to a long hole 77 of the lever grasping body 69. As shown by the alternate long and two short dashed lines of FIG. 3, in response to driving by the cylinder 79 for rotation, the grasping strip 72 rotates anticlockwise from the position indicated by the solid lines of FIG. 3 about the shaft part 71, thereby releasing the grasping strip 72 from the insert 63.

As shown in FIG. 2, the lower receiver 19 is supported on the grasping device body 12 through an attaching bracket 80 of an L shape in cross section. The attaching bracket 80 supports a receiving cylinder 83. The lower receiver 19 is supported on the upper end of the piston rod 83a. The piston rod 83a moves the lower receiver 19 up and down. The lower receiver 19 is provided with a receiving recessed part 82 formed so as to receive a lower end portion of the bead ring 15.

The operation of the grasping device 10 for the bead ring 15 is described next.

FIG. 4 shows a condition where the bead ring 15 is formed by winding around the winding unit 23. In this condition, the grasping device body 12 is arranged in a position facing the winding unit 23 of a bead ring winding machine. The cylinder 79 for rotation is made to make depressing action to release the grasping strip 72 of the upper grasping unit 16 from the insert 63 as shown by the alternate long and two short dashed lines of FIG. 3. In this condition, the grasping device body 12 is moved forward to insert the insert 63 into space of the recessed part 11 for insertion to be placed inside the bead ring 15. At this time, as a result of provision of the slanting part 63a of the insert 63, the insert 63 is inserted smoothly into a gap inside the bead ring 15. Meanwhile, the lower receiver 19 is arranged below the bead ring 15.

Next, the cylinder 79 for rotation is made to make projecting action to close the grasping strip 72 relative to the insert 63 as shown by the solid lines of FIG. 3. This makes the insert 63 and the grasping strip 72 grasp the upper part of the bead ring 15. At this time, the bead ring 15 is attached in a clamped condition by the grasping body 68 and is held in the grasping recessed part 76 of the grasping strip 72. As a result, the bead ring 15 is grasped so as not to come off the grasping device 10.

As shown in FIG. 2, after the receiving recessed part 82 of the lower receiver 19 is arranged below the bead ring 15, the receiving recessed part 82 moves up in response to projecting action of the receiving cylinder 83. As a result, the lower end of the bead ring 15 is supported in the receiving recessed part 82. Then, the partitioned members 23A to 23D of the rotary body 21 move inward in the radial direction to be separated from the bead ring 15.

As a result, the bead ring 15 is supported in the receiving recessed part 82 of the lower receiver 19 at the lower end of the bead ring 15 and is grasped by the grasping body 68 of the upper grasping unit 16 in two places of the upper part of the bead ring 15. Then, the bead ring 15 formed by winding around the winding unit 23 is grasped by the grasping device 10. Next, the grasping device body 12 retreats from the rotary body 21 and moves laterally while grasping the bead ring 15. Then, the grasping device body 12 transfers the bead ring 15 to a subsequent step.

Accordingly, this embodiment achieves the effects as follows.

(1) The grasping device 10 for the bead ring 15 grasps the upper part of the bead ring 15. The upper part of the bead ring 15 is grasped in opposite side positions with respect to the shaft 75 of the grasping strip 72.
This makes the grasping strip 72 grasp the bead ring 15 with uniform force. Thus, the bead ring 15 can be transferred to a subsequent step while being held reliably by the grasping device 10. Accordingly, this embodiment enables stable grasp of the bead ring 15 while involving only provision of the grasping strip 72 to simplify the structure of the device.

(2) The lower edge of the grasping strip 72 is provided with the grasping recessed part 76 in which the bead ring 15 is to be received in opposite side positions with respect to the shaft 75. This structure holds the bead ring 15 in the grasping recessed part 76, thereby enabling stable grasp of the bead ring 15.

(3) The grasping body 68 of the upper grasping unit 16 is formed of the insert 63 to be inserted between the winding unit 23 and the bead ring 15, and the grasping strip 72 to clamp the bead ring 15 together with the insert 63. This structure makes the insert 63 and the grasping strip 72 clamp the bead ring 15 therebetween, so that the bead ring 15 can be held by the grasping device 10.

(4) The grasping device 10 includes the lower receiver 19 to hold the lower part of the bead ring 15. This structure enables stable transfer of the bead ring 15.

(5) Each of the upper grasping unit 16 and the lower receiver 19 can move in the radial direction of the bead ring 15 relative to the grasping device body 12. This easily achieves conformance to the dimension of the diameter of the bead ring 15.

This embodiment can be modified as follows.

Two or three or more upper grasping units 16 to grasp the upper part of the bead ring 15 may be provided in response to the size of the bead ring 15, the number of the bead rings 15, or the weight of the bead ring 15, for example.

The shape of the grasping recessed part 76 may be changed to a rectangular shape or an arcuate shape. Two or more grasping recessed parts 76 may be provided in response to the number of the bead rings 15. In this case, it is preferable that the shaft 75 of the grasping strip 72 is provided in the center of a range in which the grasping recessed parts 76 are arranged. In terms of grasping multiple bead rings 15 uniformly, it is preferable that even number of grasping recessed parts 76 is provided.

A mechanism for releasing the grasping strip 72 from the insert 63 and closing the grasping strip 72 relative to the insert 63 may be changed to a mechanism for making sliding motions of the insert 63 and the grasping strip 72 while keeping the insert 63 and the grasping strip 72 parallel to each other.

- 10 Grasping device
- 12 Grasping device body
- 15 Bead ring
- 16 Upper grasping unit
- 19 Lower receiver
- 21 Rotary body
- 23 Winding unit
- 63 Insert
- 68 Grasping body
- 72 Grasping strip
- 75 Shaft
- 76 Grasping recessed part

What is claimed is:

1. A grasping device for a bead ring comprising a grasping unit with a pair of grasping bodies to grasp a bead ring formed on an outer circumferential surface of a rotary body by winding, wherein a grasping strip is pivotably supported with a shaft on one of the grasping bodies, wherein the grasping strip grasps the bead ring together with the other grasping body, the grasping strip having a lower edge provided with a grasping recessed part, wherein the grasping recessed part is configured to receive the bead ring in the opposite side positions with respect to the shaft, and the grasping strip is configured to receive the bead ring in opposite side positions with respect to the shaft.

2. The grasping device for the bead ring according to claim 1, wherein the other grasping body is an insert to be inserted between a winding unit and the bead ring.

3. The grasping device for the bead ring according to claim 1, wherein the grasping unit grasps an upper part of the bead ring.

4. The grasping device for the bead ring according to claim 1, wherein the grasping unit is capable of moving in a radial direction of the bead ring relative to a grasping device body.

5. The grasping device for the bead ring according to claim 1, comprising a receiver that receives a lower part of the bead ring.

\* \* \* \* \*